US007415115B2

(12) United States Patent
Ma

(10) Patent No.: US 7,415,115 B2
(45) Date of Patent: Aug. 19, 2008

(54) METHOD AND SYSTEM FOR DISASTER RECOVERY OF DATA FROM A STORAGE DEVICE

(75) Inventor: Kenneth Ma, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 783 days.

(21) Appl. No.: 10/437,532

(22) Filed: May 14, 2003

(65) Prior Publication Data

US 2004/0228493 A1 Nov. 18, 2004

(51) Int. Cl.

| | |
|---|---|
| ***H04L 9/00*** | (2006.01) |
| ***H04K 1/00*** | (2006.01) |
| ***G06F 11/30*** | (2006.01) |
| *G06F 3/023* | (2006.01) |
| *G06F 21/00* | (2006.01) |
| *H03M 11/10* | (2006.01) |
| *H03M 11/12* | (2006.01) |
| *H04L 9/08* | (2006.01) |

(52) U.S. Cl. ......................... 380/286; 380/30; 380/277; 713/193

(58) Field of Classification Search ................. 380/286, 380/277, 30; 713/193

See application file for complete search history.

(56) References Cited

U.S. PATENT DOCUMENTS 6,668,323 B1 * 12/2003 Challener et al. ........... 380/286

FOREIGN PATENT DOCUMENTS

WO WO 2007017885 A1 * 2/2007

OTHER PUBLICATIONS

Ragib Hasan, Suvda Myagmar, Adam J. Lee, William Yurcik; "Toward a Threat Model for Storage Systems"□□Nov. 2005, StorageSS '05: Proceedings of the 2005 ACM workshop on Storage security and survivability, pp. 94-102□□.*

* cited by examiner

*Primary Examiner*—Emmanuel L Moise
*Assistant Examiner*—Courtney D Fields
(74) *Attorney, Agent, or Firm*—McAndrews, Held & Malloy, Ltd.

(57) ABSTRACT

Aspects of the invention provide a method and system for securely managing the storage and retrieval of data. Securely managing the storage and retrieval of data may include receiving a first disaster recovery code and acquiring a first password corresponding to the first disaster recovery code. A first disaster recovery key may be generated based on the first disaster recovery code and the first password. Another aspect of the invention may also include generating the received first disaster recovery code based on said first password and the first disaster recovery key. The generated disaster recovery code may be securely stored on at least a portion of a storage device or a removable media. Data stored on the storage device may be encrypted using the first generated disaster recovery key. Additionally, data read from the storage device may be decrypted using the generated first disaster recovery key.

32 Claims, 9 Drawing Sheets

METHOD AND SYSTEM FOR DISASTER RECOVERY OF DATA FROM A STORAGE DEVICE

CROSS-REFERENCE TO RELATED APPLICATIONS/INCORPORATION BY REFERENCE

This application makes reference to U.S. patent application Ser. No. 10/437,585, entitled "Method and System for Disaster Recovery of Data from a Storage Device" and filed May 14, 2003.

The above stated application is filed concurrently herewith and is incorporated herein by reference in its entirety.

FIELD OF THE INVENTION

Certain embodiments of the invention relate to data storage systems. More specifically, certain embodiments of the invention relate to a method and system for disaster recovery of data from a storage device.

BACKGROUND OF THE INVENTION

In some conventional storage systems and/or applications, it is necessary to store data on storage devices such as hard disks or removable storage drives in an encrypted format. Upon retrieving the stored encrypted data from the storage device, the data has to be decrypted before it may be utilized. Accordingly, encryption and decryption keys are provided to encrypt and decrypt the data. For example, in personal computers (PCs,) data may be encrypted prior to being stored on a hard disk and decrypted after being read from the hard disk. However, the encryption/decryption keys which are utilized are often stored on paper or in a person's memory.

Particularly in PCs, separate devices called adapters may be utilized to provide connectivity between a storage device and a host system. For example, an ATA host adapter which may be integrated within the PC may be provided in order to connect a hard disk to the PC. The adapter may be referred to as a hard disk controller or a peripheral controller. ATA stands for AT Attachment, a standardized interface used by storage devices such as hard disk drives, CD drives and DVD drives. ATA compatible drives or storage devices may also be referred to as integrated drive electronics (IDE) drives. Notwithstanding, these adapters are primarily utilized to provide connectivity for storage devices or peripheral devices.

Accordingly, one drawback with conventional storage devices or systems is that the data stored on a storage device is not securely stored and therefore, data integrity may easily be compromised. Furthermore, although some storage devices and systems may provide various methods for encrypting stored information, the encryption keys that are utilized may be easily accessible and compromised. Additionally, existing data storage methodologies are mostly platform specific and therefore, not readily ported to other platforms and/or systems. This can be problematic in network attached remote storage systems, for example, where data integrity must be maintained as data traverses from one system component to another system component. Furthermore, certain disastrous events may either totally destroy stored data integrity and/or totally compromise the security of the data when recreating or restoring the data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for securely managing the storage and retrieval of data. The method for securely managing the storage and retrieval of data may include receiving a first disaster recovery code and receiving a first password corresponding to the first disaster recovery code. A first disaster recovery key may be generated based on the first disaster recovery code and the first password. Another aspect of the invention may also include generating the received first disaster recovery code based on said first password and the first disaster recovery key. The generated disaster recovery code may be securely stored on at least a portion of a storage device or a removable media. Data stored on the storage device may be encrypted using the first generated disaster recovery key. Additionally, data read from the storage device may be decrypted using the generated first disaster recovery key.

The method may also include selecting between a normal operating mode and a recovery operating mode in which the recovery operating mode may utilize the first generated disaster recovery key. In certain operating modes, decryption of data read from the storage device may be bypassed by selecting one or more bypass paths. Similarly, in certain operating modes, encryption of data stored on the storage device may be bypassed by selecting one or more of the bypass paths.

Another embodiment of the invention provides a machine-readable storage, having stored thereon, a computer program having at least one code section for securely managing the storage and retrieval of data. The at least one code section may be executable by a machine, thereby causing the machine to perform the steps as described above for securely managing the storage and retrieval of data.

Another embodiment of the invention provides a system for securely managing the storage and retrieval of data. The system for securely managing the storage and retrieval of data may include at least one processor adapted to at least receive a first disaster recovery code from a storage device and/or a storage media. The processor may be adapted to at least receive a first password corresponding to the first disaster recovery code. The system may also include a disaster management block configured to facilitate generation of a first disaster recovery key based on the first disaster recovery code and the first password. A recovery code generator may generate the received first disaster recovery code based on the first password and the first disaster recovery key. The processor may also securely control storage of the generated disaster recovery code on the storage device and/or the storage media. A storage device interface block may be provided to facilitate coupling of the storage device and/or the storage media to the system.

The system may also include an encryption block that may be adapted to encrypt data stored on the storage device using the generated first disaster recovery key. A decryption block may also be provided to utilize the generated first disaster recovery key to decrypt data read from the storage device. A selector may be adapted to select between a normal operating mode and a recovery operating mode in which the recovery operating mode may require the generation of the first disaster recovery key. At least one bypass path may be configured to bypass the decryption block. At least one bypass control register may be provided to control selection of one or more bypass paths required for bypassing the decryption block. One or more of the bypass paths may also be utilized to bypass the encryption block. The bypass control register may also control selection of one or more of the bypass paths required for bypassing the encryption block.

The system may also include at least one bus interface block coupled to the encryption block and/or the decryption block. At least one register such as a secret key register, may be utilized for storing the disaster recovery key. The register or other memory storing the disaster recovery key may be configured as a read-only register. In accordance with an aspect of the invention, the at least one processor, the disaster management block, the selector, the bypass paths, the bypass control register, the encryption block, the decryption block, the bus interface block, the storage device interface block and the register or memory for storing the disaster recovery key may be integrated in plug-in card, a chip or a processor core. The selector may be a multiplexer.

These and other advantages, aspects and novel features of the present invention, as well as details of a illustrated embodiment thereof, will be more fully understood from the following description and drawings.

DETAILED DESCRIPTION OF THE INVENTION

Aspects of the invention provide a method and system for securely managing the storage and retrieval of data. The method may include receiving a first disaster recovery code and acquiring a first password corresponding to the first disaster recovery code. A first disaster recovery key may be generated based on the first disaster recovery code and the first password. Another aspect of the invention may also include generating the received first disaster recovery code based on said first password and the first disaster recovery key. The generated disaster recovery code may be securely stored on at least a portion of a storage device or a removable media. Data stored on the storage device may be encrypted using the first generated disaster recovery key. Additionally, data read from the storage device may be decrypted using the generated first disaster recovery key.

The method may also include selecting between a normal operating mode and a recovery operating mode in which the recovery operating mode may require usage of the first generated disaster recovery key. In certain operating modes, decryption of data read from the storage device may be bypassed by selecting one or more bypass paths. Similarly, in certain operating modes, encryption of data stored on the storage device may be bypassed by selecting one or more of the bypass paths.

Another aspect of the invention may provide a method and system for disaster recovery of data from a storage device. This may include establishing a first disaster management password for recovering information stored on a first storage device. The first disaster management password and a first disaster recovery code may be securely stored to ensure its integrity. In response to a disaster event, the stored first disaster management password may be acquired and utilized in determining the first disaster recovery code. In order to respond to the disaster event, the first disaster recovery code may be determined based on the first disaster management password. Exemplary disaster events may include, but are not limited to, a malfunctioning host system, a malfunctioning storage device, a maintenance event and/or a compromised password. The first disaster recovery code may be determined or decoded based on the first disaster management password.

A first disaster management key may be generated from decoding the first disaster recovery code based on the first disaster management password. The first disaster recovery code may be written to or stored to a first specified portion or location of a first storage device and/or a second storage device. The first and/or the second storage device may be a hard disk, a CDROM, a DVD, a secured (SD) digital memory, a compact flash (CF) memory, a memory chip, a register and/or a memory card.

Figure 1:
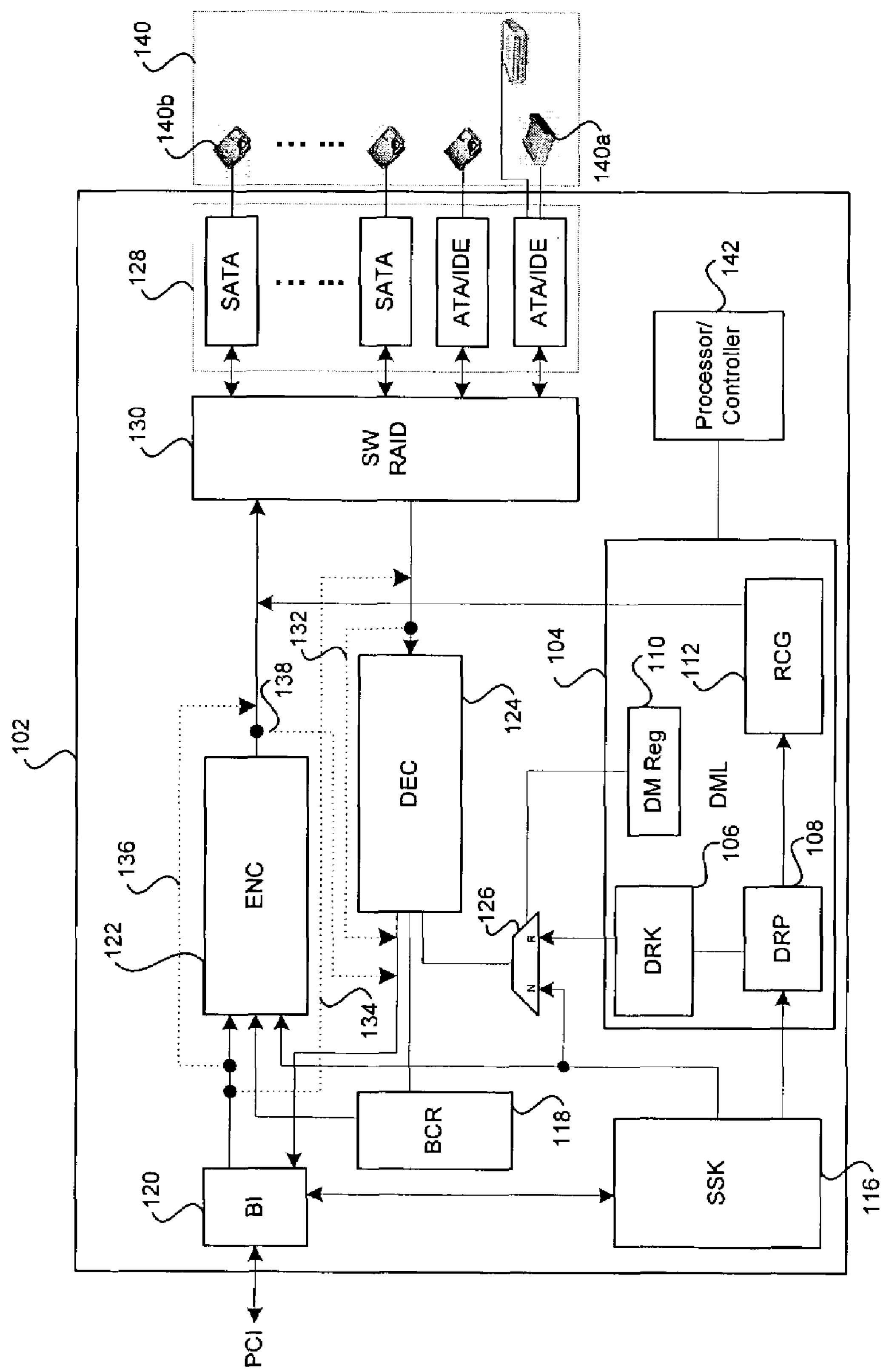
FIG. 1 is a block diagram of an exemplary system for disaster recovery of data from a storage device in accordance with an embodiment of the invention.

FIG. 1 is a block diagram of an exemplary system for disaster recovery of data from a storage device in accordance with an embodiment of the invention. Referring to FIG. 1, there is shown a secured storage controller (SSC) 102 which may include a disaster management logic (DML) block 104, a secured storage controller (SSC) secret key (SSK) block 116, a bypass control register (BCR) block 118, a bus interface (BI) block 120, an encryption (ENC) block 122, a decryption (DEC) block 124, a multiplexer (MUX) 126, a storage device interface block 128, a SW RAID block 130, and a plurality of storage devices 140.

The secured storage controller (SSC) 102 may also include a processor or/controller 142 that may be adapted to control the operations of the devices comprising the secured storage controller (SSC) 102. These may include, but are not limited to, the DML block 104, the SSK block 116, the BCR block 118, the bus interface block 120, the encryption block 122, the decryption block 124, the device interface block 128, and/or the SW RAID block 130 where necessary. The processor 142 may be configured to communicate with, for example, a host system processor or host processor such as a CPU of a PC. One or more applications running on the host system processor or the secured storage controller 142 may be configured to control some or all of the operations of the secured storage controller 102.

FIG. 1 also illustrates various bypass signal paths including bypass during disaster recovery process path 132, redirection for remote restore path 134, bypass for writing or sharing clear data path 136, and re-direction for remote backup path 138. The bypass during disaster recovery process path 132 may be utilized to bypass the decryption block 124. The redirection for remote restore path 134 may bypass encryption block 122 and couple an output of the bus interface block 120 to an input of decryption block 124. The redirection for remote restore path 134 may be utilized as a redirection path from the bus interface block 120 directly to the input of the decryption block 124. The bypass for writing or sharing clear data path 136 bypasses encryption block 122 and may be utilized for sharing, for example, data on a shared media such as CD-R. The redirection for remote backup path 138 is a redirection path from the output of the encryption block 122 back to the bus interface 120. In this regard, the redirection for remote backup path 138 bypasses the decryption block 124 in order to couple an output of the decryption block 122 to an input of the bus interface block 120.

The disaster management logic (DML) block 104 may include a disaster recovery key (DRK) block 106, a disaster recovery password (DRP) block 108, a disaster management register (DM Reg) 110 and a disaster recovery code generator (RCG) 112. The disaster management logic block 104 of the secured storage controller 102 may be adapted to control various disaster recovery operational modes and/or control and manage certain disaster events.

The disaster management register 110 may include one or more bits that may be utilized to control the disaster recovery mode. In an embodiment of the invention, the DM register 110 may be a 1-bit register that may be utilized to control MUX 126 to select between a normal (N) mode or a recovery (R) mode. For example, logic zero (0) may be utilized to select a normal operating mode (N) and logic one (1) may be utilized to control a disaster recovery operation mode (R). Alternatively, logic one (1) may be utilized to select a normal operating mode (N) and logic zero (0) may be utilized to control a disaster recovery operation mode (R).

The disaster recovery key (DRK) block 106 may be adapted to generate at least one disaster recovery key based on a password from the disaster recovery password block 108 and a disaster recovery code (DRC). The disaster recovery key may be a temporary disaster recovery key, although the invention is not limited in this regard. The disaster recovery code may be generated by the disaster recovery code generator (RCG) block 112 and/or stored either on one or more storage devices. For example, the disaster recovery code may be stored on a specified sector or in a particular file on hard disk or on a removable storage media, including but not limited to, a floppy disk, a USB drive, a compact flash (CF) memory and/or a memory card. In the case of a removable storage media, the removable storage media may provide additional flexibility since the media may be removed and securely stored in a safe location. Accordingly, the stored media may be retrieved and the disaster recovery code read whenever it is required.

The secured storage controller (SSC) secret key (SSK) block 116 may be a register or other memory that may be adapted to store one (1) or more secret keys. The secured storage controller (SSC) secret key (SSK) block 116 may be coupled, via a bi-directional link, to the bus interface (BI) block 120. The secured storage controller secret key block 116 may also be coupled to the disaster recovery password block 108, a normal input of MUX 126 and finally to an input of the encryption block 122. In a disaster event where a disaster recovery password may have leaked, for example, a disaster management action may require re-encrypting at least a portion of the storage device with a different secret key. In this mode of operation, the secured storage controller secret key block 116 may be adapted to provide a first key, namely key 1, for decryption and a second key, namely key 2, which may be utilized for re-encryption. In this regard, the first key, key 1 is the original key, while the second key, key 2, is the newly established secret key. In one aspect of the invention, the secured storage controller secret key block 116 may be configured to operate so that key 1 and key 2 are not externally exposed, but remain within the secured storage controller secret key block 116.

The bypass control register (BCR) block 118 is a register that may be utilized to select which storage device controller interface may be active and will be written with encrypted or clear data. For example, in a case where the BCR has eight (8) bits, bit zero (0) may be mapped so that it corresponds to storage device 0, bit 1 to storage device 1, bit 2 to storage device, and so on. The bypass control register block 118 may be accessible by an internal processor/controller 142 or external processor. In this regard, the internal processor/controller 142 may be a processor residing on the secured storage controller (SSC) 102. An external processor may be a host processor, for example, a CPU of a PC into which the SSC 102 may be coupled or plugged or integrated. Integrating the SSC 102 may include integrating the SSC's functionality in a motherboard of the PC or other host device.

Figure 2:
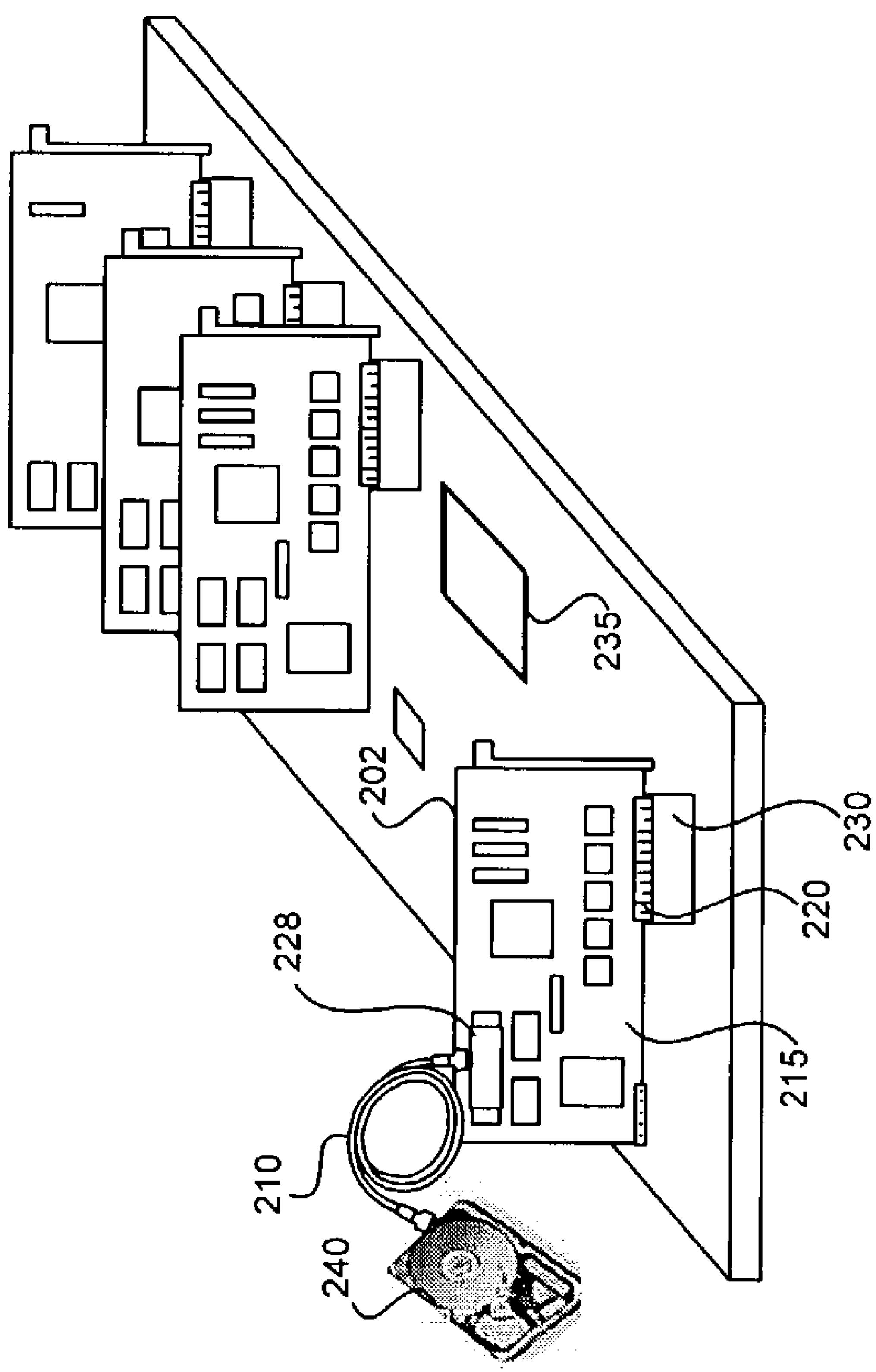
FIG. 2 is a block diagram of an exemplary PC-based system which may be utilized for data storage, retrieval and recovery in accordance with an embodiment of the invention.

The bus interface (BI) block 120 may be any suitable bus interface, including but not limited to, a USB, ISA, Firewire (IEEE 1394), PCI, PCI-X, PCI-Express and SCSI bus. The bus interface block 120 may be coupled to the secure secret key block 116, the encryption block 122 and the decryption block 124. The bus interface block 120 may permit the secured stored controller (SSC) 102 to be coupled to a host device such as a PC bus. FIG. 2 is a block diagram of an exemplary PC-based system which may be utilized for data storage, retrieval and recovery in accordance with an embodiment of the invention. Referring to FIG. 2, there is shown a PC motherboard 215, a secured storage controller plug-in card 202, a cable 210, and a CDROM drive 240. The motherboard 215 includes a main processor or CPU 235. The secured storage controller plug-in card 202 may include one or more connector blocks for coupling peripheral devices. The connector block 228 may be a device interface block similar to that of the device interface block 128 of FIG. 1. The secured storage controller plug-in card 202 may also include a bus interface block 220, which may also be similar to that of the bus interface block 120 of FIG. 1. The connector block 228 may provide a suitable connector to which cable 210 may be coupled. Accordingly, the cable 210 may couple the secured storage controller plug-in card 202 to the CDROM storage device 240.

Although the secured storage controller 202 is illustrated as a plug-in card, the invention is not so limited. Accordingly, in another aspect of the invention, the secured storage controller may be integrated within motherboard 215. For example, the secured storage controller may be implemented as a chip that may be integrated within the motherboard 215. In another embodiment of the invention, the secured storage controller may be integrated within the core of a chip.

The encryption (ENC) block 122 may be, for example, an encryption core or encryption engine that may be adapted to perform the real-time encryption based on a key provided by the SSK block. The decryption (DEC) block 124 may be, for example, a decryption core or decryption engine that may be adapted to perform real-time decryption based on a key provided by either the secured storage controller (SSC) secret key (SSK) block 116 operating in normal mode or by the DRK 106 operating in disaster recovery mode.

The multiplexer (MUX) 126 may be a 2-to-1 multiplexer which may be controlled by the disaster management register 110. The MUX 126 may be configured to select between a normal mode of operation and recovery mode of operation during the disaster recovery process.

In FIG. 1, the redundant array of inexpensive discs (RAID) block 130 may be an optional block. The RAID block 130 may be an optional block that may be utilized to provide redundant storage of data to any two or more of the storage devices, collectively 140. The RAID block 130 may be coupled to the device interface block 128. The device interface block 128 may include one or more of a plurality of device interfaces. For example, as illustrated, the device interface block 128 may include a plurality of SATA interfaces and ATA/IDE interfaces. Although SATA and ATA/IDE interfaces are illustrated in FIG. 1, the invention is not limited in this regard. Accordingly, other exemplary device interfaces may include but are not limited to, IDE/ATA, ATAPI, serial-ATA, SCSI, serial-attached SCSI, Fibre Channel or any other interface that may provide connectivity for a storage device.

One or more storage devices may be coupled to each of the device interfaces in the device interface block 128. Exemplary storage devices 140 may include, but are not limited to a hard disk, a magneto optical disc, a compact disc (CD), a digital versatile disc (DVD) or any variants thereof. Exemplary variants may include, but are not limited to, CD-R, CD-RW, DVD−R/−RW, DVD+R/+RW, DVD-RAM.

In one aspect of the invention, the RAID block 130 may be a software RAID (SW RAID) controller. In this regard, the SW raid controller block 130 may be a pure software RAID having no hardware. Notwithstanding, the invention is not limited in this regard and the RAID controller block 130 may be a software RAID with an exclusive OR (XOR) engine or other suitable hardware accelerator. Alternatively, the RAID controller block 130 may be a pure hardware RAID controller. Notwithstanding, the RAID controller block 130 may be adapted to provide at least a selected level of RAID functions.

The bypass during disaster recovery process path 132 may be utilized in instances where it may be necessary to bypass the decryption block 124. During a normal reading mode, the bypass during disaster recovery process path 132 may bypass decryption block 124 when reading clear data from selected storage devices. The bypass during disaster recovery process path 132 may be controlled by the bypass control register block 118. During a disaster recovery mode of operation, if the disaster recovery code is written onto a specified sector or file of one of the local storage devices in device storage block 140, the disaster recovery code may bypass the decryption block 124 and the disaster recovery code may be transferred to the disaster recovery key block 106. The disaster recovery key block 106 may utilize the transferred disaster recovery code to generate a temporary disaster recovery key.

The redirection for remote restore path 134 is a redirection path that may be utilized in instances where it may be necessary to transfer data from the bus interface block 120 directly to the input of the decryption block 124. For example, during a remote restore process, an external or internal processor may be adapted to read, for example, an encrypted backup image from a external or network device. The read data may be decrypted by the decryption block 124 and then transferred back to the bus interface block 120, the application may analyze the location to be written onto the storage device 140. If the target storage device such as 140*a* is a clear driver, or the target sector is not encrypted on an encrypted drive, the data will bypass encryption block 122 and written onto storage device 140. Otherwise, the data will be transferred to the encryption block 122 and write the encrypted data onto storage device 140.

The bypass for writing or sharing clear data path 136 may be utilized in instances where it may be required to share information from a shared media. For example, a networked base CDROM tower may contain a plurality of CDROMs. The bypass for writing or sharing clear data path 136 may be controlled by the bypass control register block 118. In a case where a storage device such as storage device 140*a* is selected to be a clear drive, then data written to storage device 140*a* may bypass the encryption block 122. In instances where the storage may be an internal storage device such as storage device 140*a*, once the bypass control register 118 is initialized, it may not be dynamically changed. However, in the case of a removable storage device or media, the bypass control register 118 may be dynamically configured. Notwithstanding, the invention is not limited in this regard.

The re-direction for remote backup path 138 is a redirection path which may be utilized to transfer data from the output of the encryption block 122 to the bus interface block 120. During a remote backup process, a host processor may be adapted to utilize the encryption block 122 to encrypt the data without storing or writing the encrypted data to any of the storage devices in storage device block 140. In this regard, the redirection for remote backup path 138 may be adapted to redirect the encrypted data back to the bus interface block 120. For example, input data may be encrypted by encryption block 122 and then transferred or redirected back to the bus interface block 120 using the redirection for remote backup path 138. However, the encrypted data is not written to any of the storage devices such as storage device 140*a* in storage device block 140. In one aspect of the invention, the encrypted data may be re-directed to the bus interface block 120, from which it may be transferred to an external storage device such as a network device or a device connected to the host bus.

Figure 3:
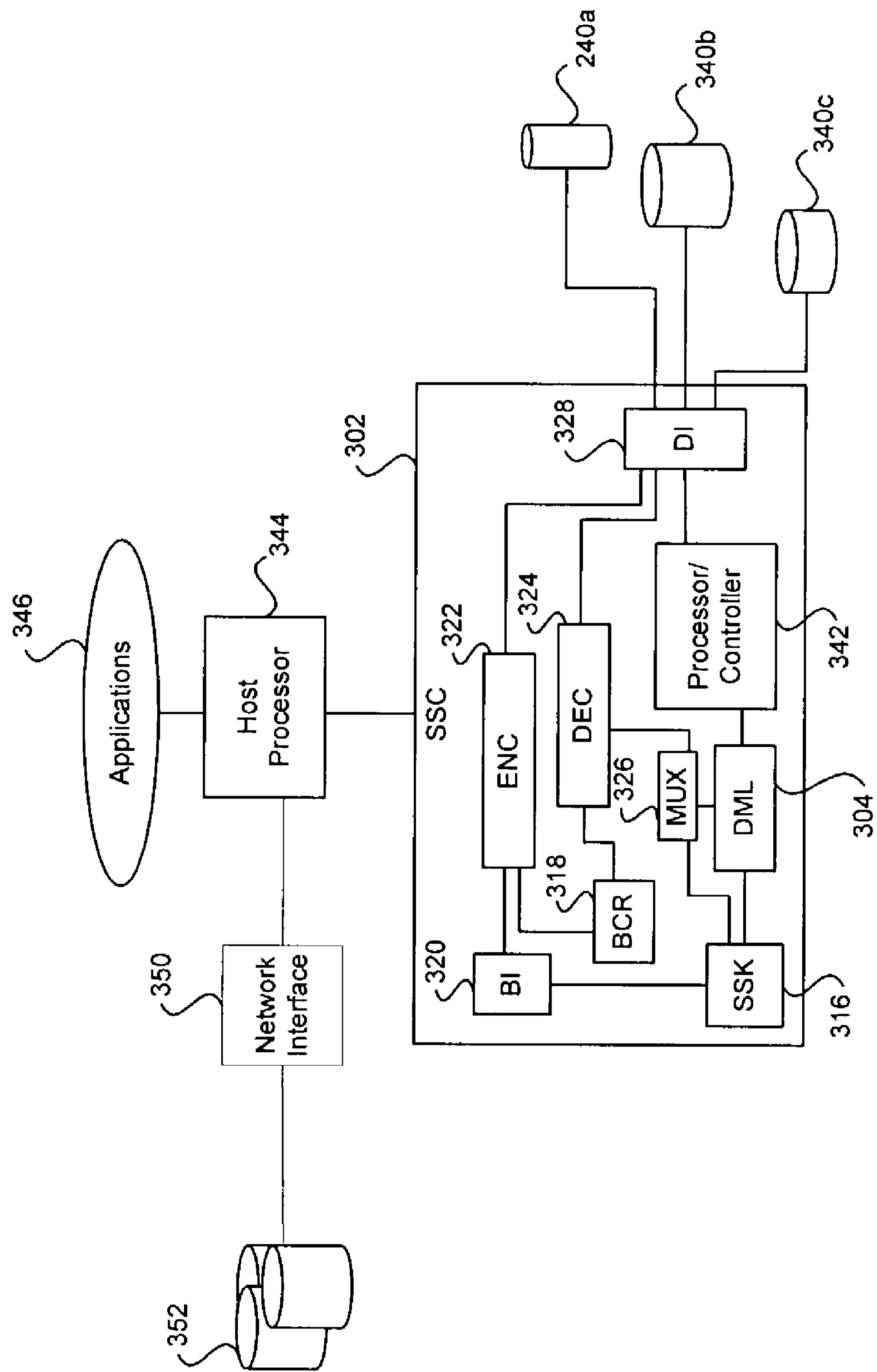
FIG. 3 is a block diagram of a disaster recovery system that utilizes a secured storage controller in accordance with an embodiment of the invention.

FIG. 3 is a block diagram of a disaster recovery system that utilizes a secured storage controller in accordance with an embodiment of the invention. Referring to FIG. 3, there is shown an applications block 346, a host processor block 344, a secured storage controller block 302 and a plurality of storage devices, namely 340*a*, 340*b* and 340*c*. The secured storage controller 302 may include a DML block 304, SSK block 316, a BCR block 318, a bus interface block 320, an encryption block 322, a decryption block 324, a MUX 326, a device interface (DI) block 328 and a processor/controller block 342. One or more of the applications 346 may be adapted to run on the host processor 344 and may be utilized to control the operation of the secured storage controller 302. The processor or controller 342 may be configured to control the operation of the secured storage controller 302. In this regard, the processor or controller 342 may communicate with the host processor 344. A network interface block 350 may be coupled to the host processor 344. A remote storage device 352 may be coupled to the network interface block 350.

In operation, prior to first use, a password may be established for future disaster recovery use. In this regard, one or more applications may be utilized to setup and establish the password. An application may then be adapted to control the DRP block 108 so that the password may be written to the DRP block 108, the latter of which may be a write-only register. The RCG block 112 may generate the disaster recovery code based on the password and the SSC secret key. In one aspect of the invention, the disaster recovery code may be written to a sector that starts with a special signature. The signature may be any code or clear text, which may be a special sector or file utilized for the disaster recovery code. Any prior disaster recovery code may be cleared. In this case, the disaster recovery code may not be further encrypted by the encryption block 122 and subsequent read, write, or copy operations of this sector will always bypass the encryption block 122 and the decryption block 124. However, the invention is not so limited and the bypass operations may be design or implementation dependent. The disaster recovery code may be written to or stored on, for example, a removable storage media, or a network attached media or device. During a disaster recovery operation, the removable media may be attached so that the disaster recovery code may be retrieved. The storage device such as a hard disk is now ready to be used.

In a bypass mode of operation, an application may be adapted to control the bypass control register 118 so as to bypass the encryption block 122 and/or the decryption block 124 for certain portions of the storage device. In one aspect of the invention, the encryption block 122 and/or the decryption block 124 may be bypassed for certain sectors of the storage device, for example. One or more applications may be utilized to convert portions of a storage device which may be encrypted to clear data and to convert portions of a storage device which may be clear to encrypted data. The BCR 118 may have corresponding BCR values, which may be stored in an on-chip flash, for example. One or more applications may be configured to dynamically bypass the encoder block 122 and/or the decoder block 124. In a case where it may be necessary to share data, clear data may be written to, for example, a CD/DVD-RW for sharing.

Figure 4:
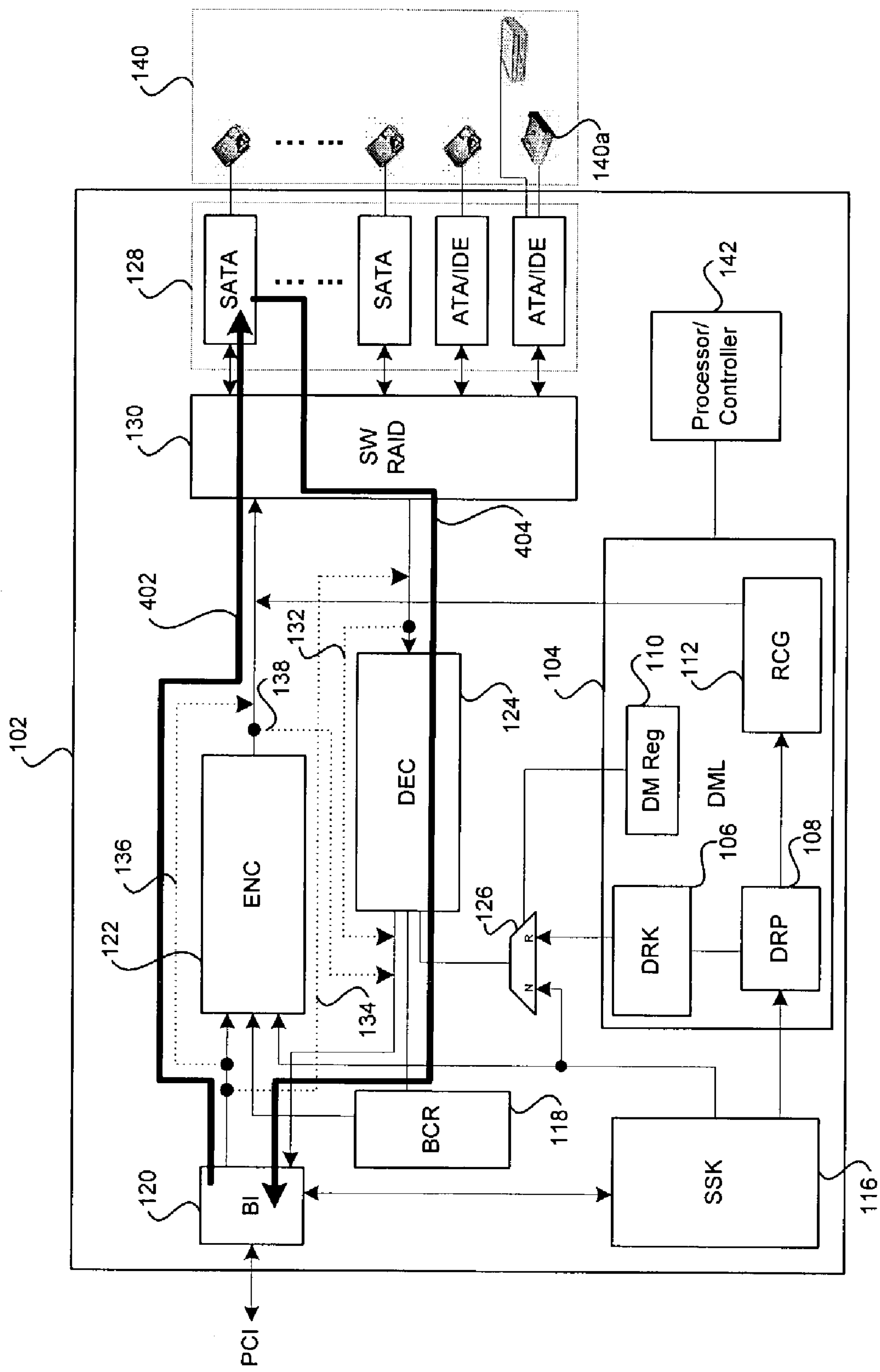
FIG. 4 is a block diagram illustrating an exemplary path for a secured-to-clear mode of operation in accordance with an embodiment of the invention.

In accordance with an aspect of the invention, in order to properly secure data, encrypted data may be written to a storage device for archiving. This may also allow non-critical data to be stored on a hard disk, thereby permitting large data blocks to be moved between systems which cannot be handled by certain storage devices such as DVD-RW or tape. One or more applications may be adapted to convert at least a portion of the data on a storage device between a secure and an clear mode and vice versa. In a secured-to-clear mode of operation, data may be read through decryption block 124 and written to the storage device so that the encryption block 122 is bypassed. FIG. 4 is a block diagram illustrating an exemplary path for a secured-to-clear mode of operation in accordance with an embodiment of the invention. Referring to FIG. 4, path 404 illustrates a data path used to transfer data from the storage device block 140, through decryption block 124 to the bus interface block 120. The decryption block 124 may decrypt the data while it is transferred from the storage device block 140 to the bus interface block 120. However, path 402 utilizes the bypass for writing and sharing clear data path 136 to bypass encryption block 122 when data is being transferred from the bus interface block 120 to a storage device in storage device block 140.

Figure 5:
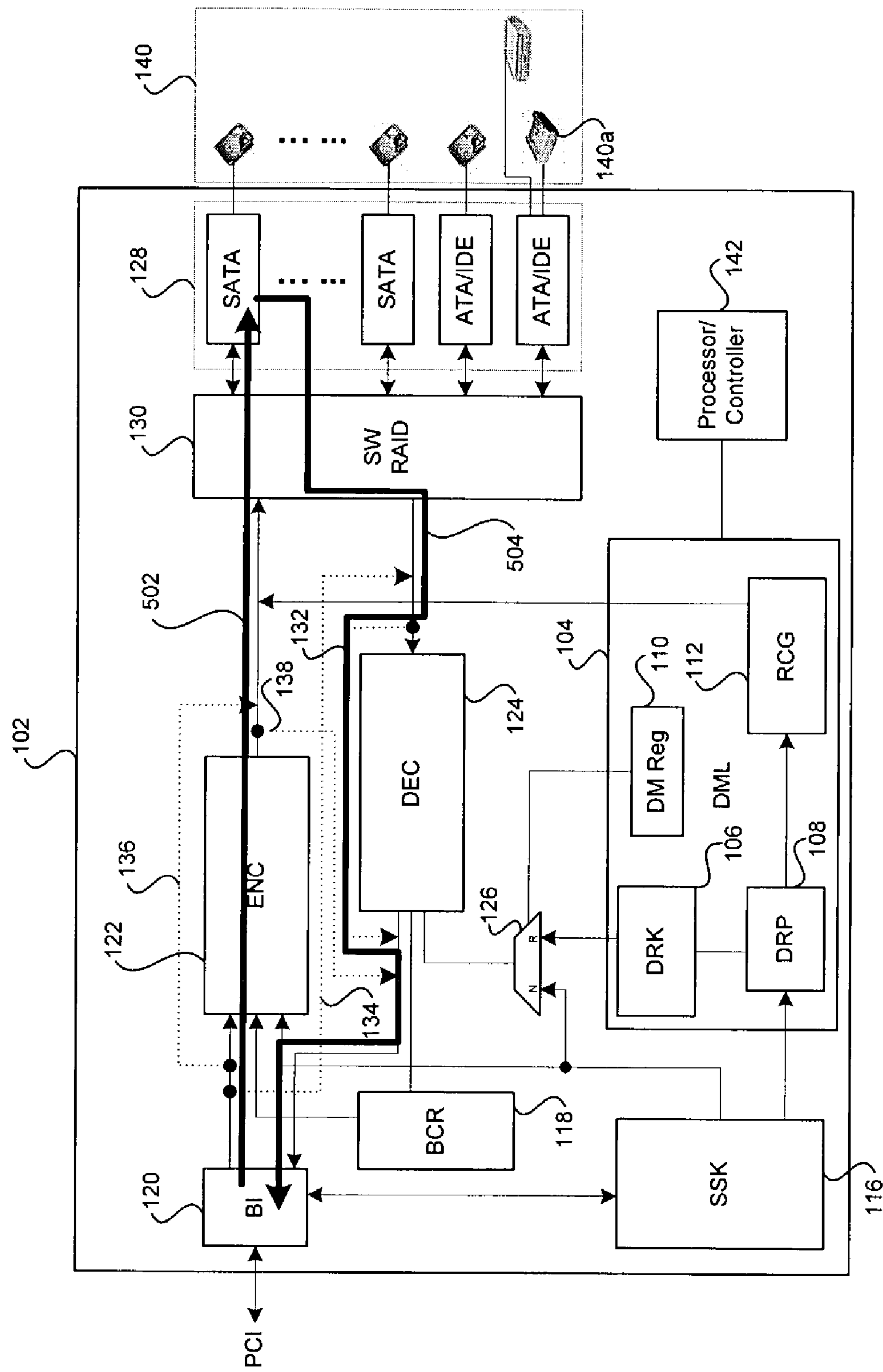
FIG. 5 is a block diagram illustrating an exemplary path for a clear-to-secured mode of operation in accordance with an embodiment of the invention.

In a clear-to-secured mode of operation, data may be read bypassing decryption block 124 and written through the encryption block 122. FIG. 5 is a block diagram illustrating an exemplary path for a clear-to-secured mode of operation in accordance with an embodiment of the invention. Referring to FIG. 5, path 504 may be utilized to transfer data from the storage device block 140 to the bus interface block 120 utilizing bypass path 132. The path 502 may be utilized to transfer data from the bus interface block 120 through the encryption block 122 to the storage device block 140. The encryption block 122 encrypts the data as it is transferred from the bus interface block 120 to the storage device block 140.

In operation, the secured storage controller 102 may be adapted to securely backup at least a portion of the files on a storage device such as a hard disk or a complete storage device image from remote locations such as network attached storage (NAS), storage area network (SAN), mapped network drive and/or removable storage media such as CD-RW. This may occur even though those devices are not connected directly to SSC 102. One or more applications may be adapted to control a backup/restore mode of operation. Accordingly, the secured storage controller 102 may be configured to operate in a secure remote backup mode. An encrypted local storage device image may be decrypted using the SSC secret key. The application may be adapted to analyze the data, create an appropriate file-level structure and prepare a data image for remote storage. The prepared data image for the drive may be redirected to the SSC 102 for encryption by the encryption block 124 using the SSC secret key (SSK). A resultant encrypted data stream or data image may be transferred to the remote storage device or disk for secure backup. Upon completion, the secured storage controller 102 may be placed in a normal mode of operation.

Figure 6:
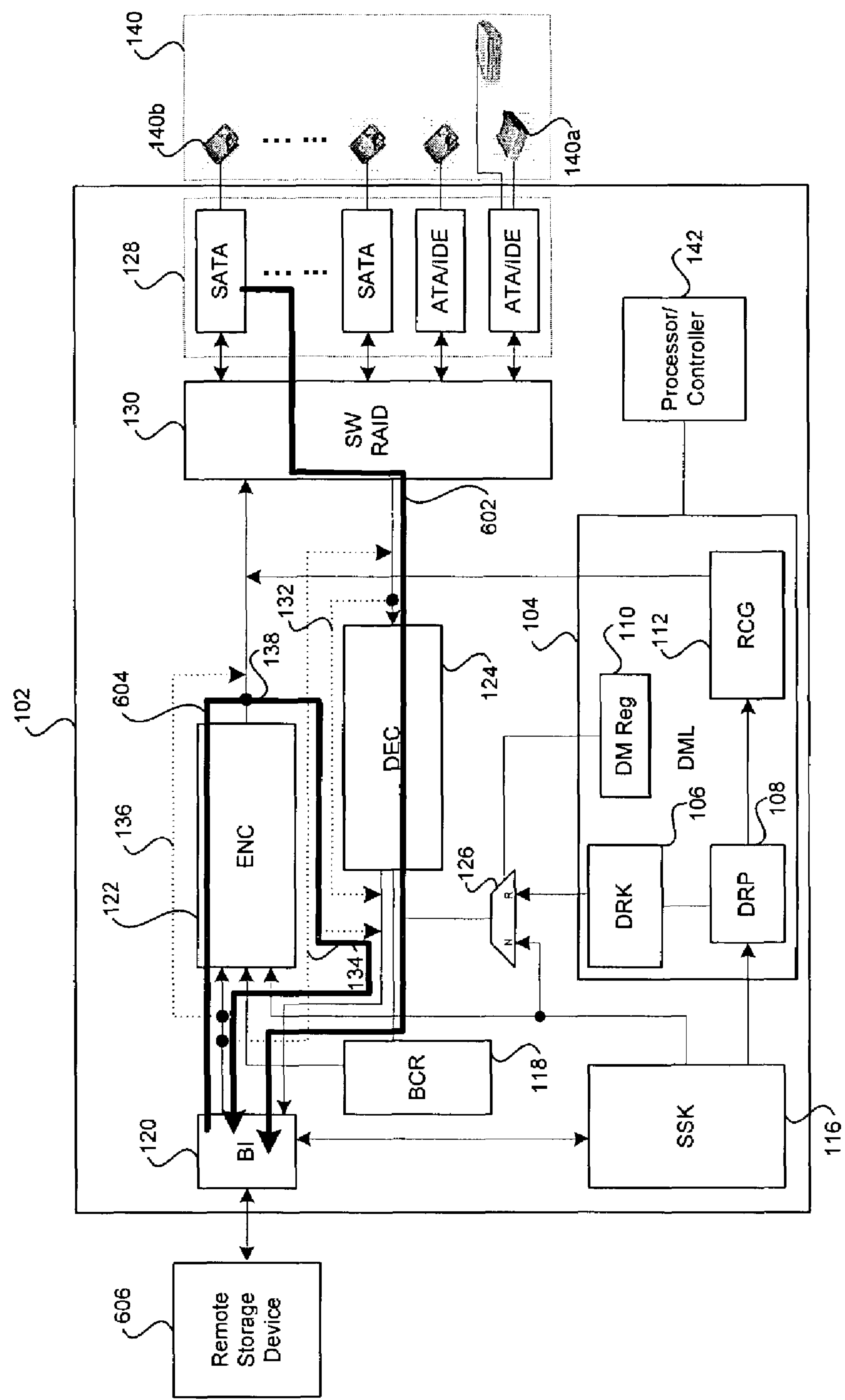
FIG. 6 is a block diagram illustrating a secure remote backup in accordance with an embodiment of the invention.

FIG. 6 is a block diagram illustrating a secure remote backup in accordance with an embodiment of the invention. Referring to FIG. 6, path 602 may be utilized to transfer the prepared data from the storage device block 140 to the bus interface block 120 through the decryption block 124. Data transferred from the storage device block 140 may be decrypted by the decryption block 124. The application may analyze the data, create an appropriate file-level or block-level structure for backup to remote storage device. If user desires a clear backup image, the decrypted data can be transferred to the remote storage device. If user desires an encrypted backup image, the data will go through Path 604 and encrypted by encryption block 122 and then redirected back to the bus interface block 120 before transferring to the remote storage device.

In accordance with another aspect of the invention, the secured storage controller 102 may be adapted to provide restoration of specific files and restoration of at least a portion of the data stored on a storage device. In this regard, the secured storage controller 102 may restore, for example, some of the files on a hard disk or a complete image of a hard disk or other storage media. The data may be securely restored to remote locations such as a NAS, SAN, mapped network drive and/or removable storage media such as CD-RW, even though those devices are not directly connected to SSC 102. In one aspect of the invention, one or more applications may be adapted to setup the secured storage controller 102 to operate in a secure remote restore mode.

In operation, an encrypted drive image received from a remote location may be decrypted by the decryption block 124 using the secured storage controller secret key (SSK). The decryption results in the generation of clear data. The application may analyze the information and/or data on the storage device, create appropriate file-level structures and prepare the storage device image or a portion thereof for storage on a local storage drive. The data and/or information corresponding to the newly prepared storage device image may be redirected to the secured storage controller 102 for encryption by the encryption block 122 using the SSK. Subsequent to being encrypted, and encrypted stream is stored securely on the local storage device such as storage device **140*b***. Upon completion of the secure remote restore operation, the secured storage controller may be configured to operate in a normal mode of operation.

Figure 7:
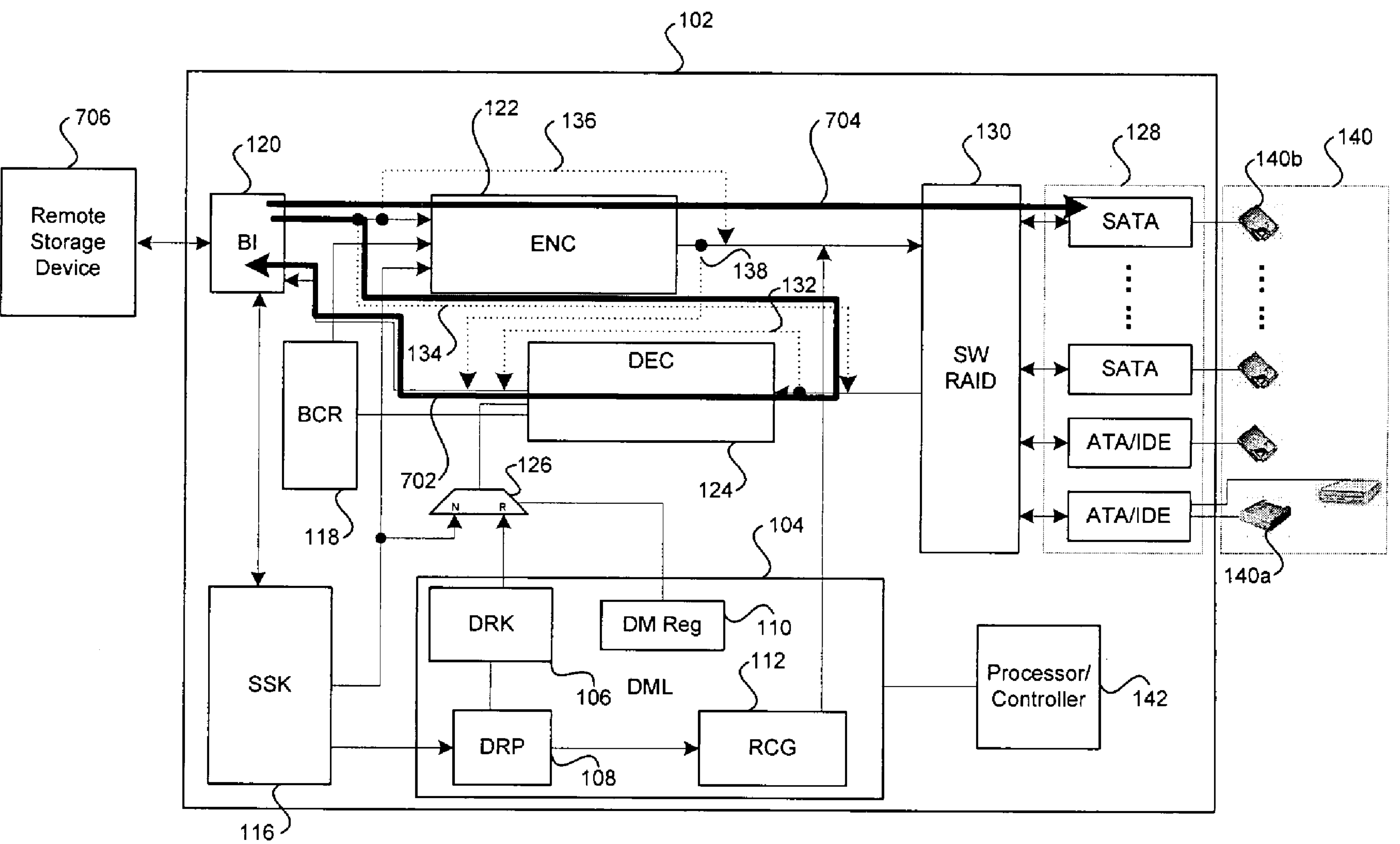
FIG. 7 is a block diagram illustrating a secure remote restore in accordance with an embodiment of the invention.

FIG. 7 is a block diagram illustrating a secure remote restore in accordance with an embodiment of the invention. Referring to FIG. 7, path 702 may be utilized to transfer data from the remote storage device 706, through the bus interface block 120 into the decryption block 124 and back to the bus interface block 120. The application may analyze the clear data and determine the location to be written onto the local storage device. If the target storage device such as **140*a* is a clear drive, or the target sector is not encrypted on an encrypted drive, the data will bypass encryption, otherwise, it will go through Path 704 and written as encrypted data onto local storage device 140. Path 704 illustrates the encryption of the data and the subsequent transfer to a local storage device in storage device block 140**.

In an alternate embodiment of the invention, the data decrypted by the decryption block 124 may be buffered in an on-chip memory or a memory located within the secured storage controller 102. The buffered data may subsequently be transferred to the encryption block 122 where it may be encrypted. The resulting encrypted data may then be transferred to the storage device block 140 where it may be stored in one or more of the storage devices such as 140*a* and 140*b*. In yet another embodiment of the invention, the decrypted data may be transferred directly from the decryption block 124 to the encryption block 122 for encoding. In this regard, the encryption block 122 may include suitable memory or buffers to buffer the decrypted data from the decryption block 124.

In accordance with another embodiment of the invention, data may be recovered in cases where a host processor or the secured storage controller malfunctions or is not operational. For illustrative purposes, the host processor may be part of or associated with a PC and the storage device may be a hard disk coupled to a SSC within the PC. Exemplary host processors are illustrated in FIG. 2. and FIG. 3. Notwithstanding, a password may be requested by one or more controller applications. In a case where there is a special signature sector on the hard disk, the disaster recovery code (DRC) may be retrieved. Alternatively, if the disaster recovery code was stored in a removable storage media, the application may request that the removable media be attached in order to retrieve the disaster recovery code. In any case, the disaster recovery code may be decoded to recover the prior disaster recovery key (DRK) utilized. In this regard, the DML block 104 may be adapted to function as a decoder.

The disaster management logic (DML) block 104 may generate the new signature based on the SSK and password. The newly generated signature may be stored on the special disk sector or on a removable media. The DML block 104 may also set the disaster mode bit in the disaster management register (DM reg) 110 in order to configure the MUX 126 to use the disaster recovery key from the DRK block 106 for decryption. The decrypted data may be transferred to the encryption block 122 where it may be re-encrypted using the SSC secret key (SSK), before being written back to the hard disk. Subsequently, the MUX 126 may be configured so that the secured storage controller 102 operates in a normal mode. Data recovery in cases where a host processor or the secured storage controller malfunctions or is not operational is illustrated in FIG. 8.

Figure 8:
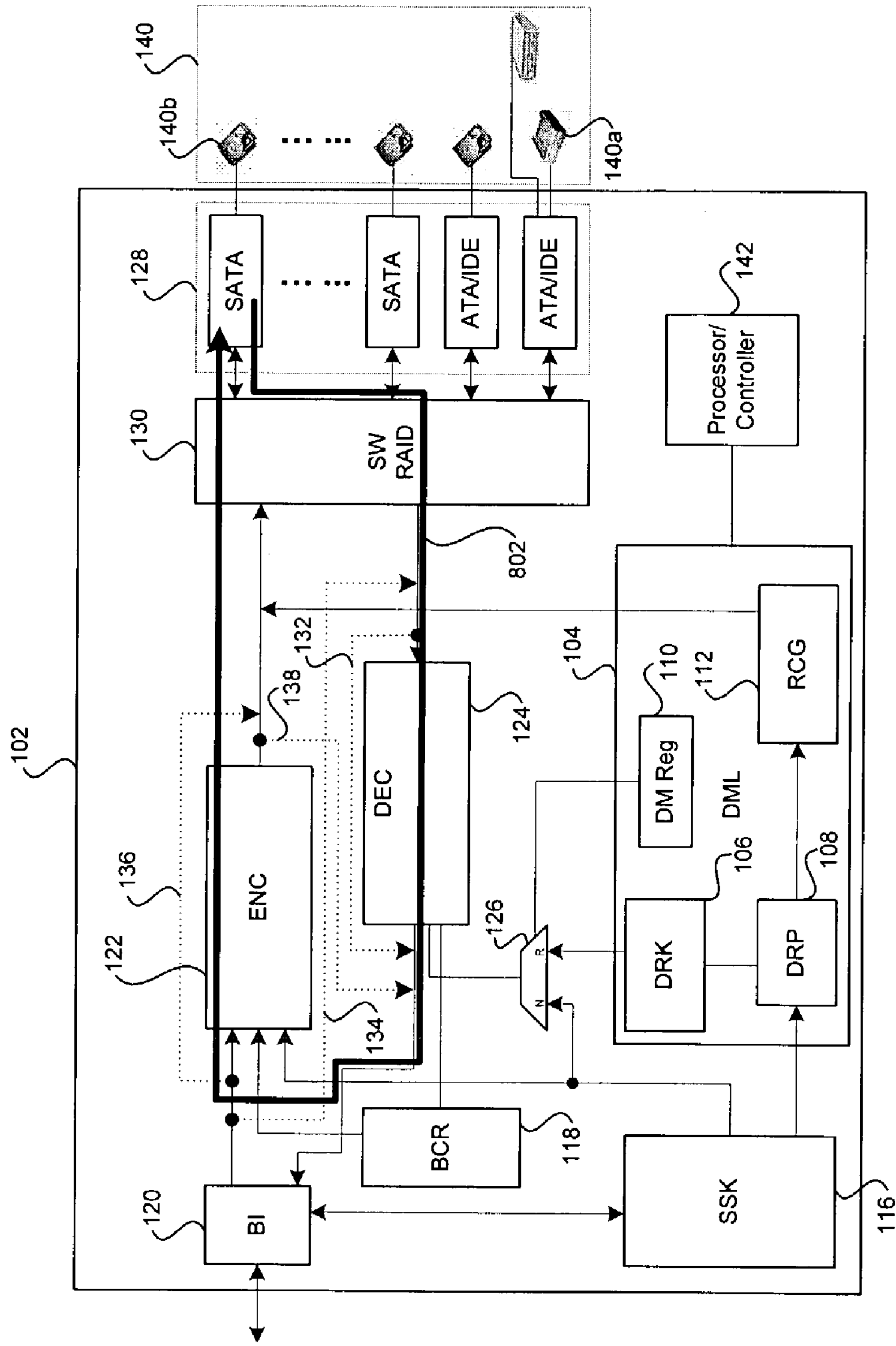
FIG. 8 is a block diagram illustrating an exemplary data recovery by the secured storage controller of FIG. 1 in accordance with an embodiment of the invention.

FIG. 8 is a block diagram illustrating an exemplary data recovery by the secured storage controller of FIG. 1 in accordance with an embodiment of the invention. Referring to FIG. 8, the secured storage controller 102 may be adapted to recover data when a host device or the secured storage controller malfunctions or is inoperable. Path 802 illustrates an exemplary path that may be utilized by the secured storage controller 102 to recover data when the host device or the secured storage controller malfunctions or is inoperable. In this regard, after generating the DRK, the data may be retrieved and decrypted by the decryption block 124. The decrypted data may be re-encrypted by the encryption block 122 using a different encryption key and then stored in a storage device such as hard disk 140*b*.

The secured storage controller 102 may be adapted to recover data in cases where a storage device malfunctions or is not operational. For illustrative purposes, the host processor may be part of a PC and the storage device may be a hard disk coupled to a secured storage controller within the PC. Additionally, it will be assumed that an encrypted backup drive image exists and will be utilized to restore the data on a new or replacement hard disk. In this regard, the new or replacement hard disk may be installed to replace the hard disk that has malfunctioned or is not operational. A secured remote restore operation may then be performed as illustrated in FIG. 7. Subsequent to the secured remote restore, the hard drive is now ready to be used and the PC may be rebooted to initialize the system to a known state.

The secured storage controller 102 may also be adapted to recover data in cases where a password may have been compromised. One or more applications may be adapted to save the current SSK for temporary use as a DRK. A new disaster recovery password may be requested and established. If the SSK block 116 contains more than one pre-programmed secret keys, it is directed to switch to a next available unique SSK. An on-chip flash, which may be located within the SSK block 116 may be adapted to track or keep an accounting of the requested passwords. For example, a running count of the passwords may be maintained. Accordingly, whenever a determined number of passwords have been utilized, an unusable flag may be set to signify that the preprogrammed count has been reached.

On a trusted computing platform alliance/trusted platform module (TCPA/TPM) compliant client, for example, a new SSC secret key (SSK) or bulk encryption key may be requested from a TPM. The DML block 104 may generate the new disaster recovery code using a new password and the new SSC secret key. The newly generated disaster recovery code may be saved on the storage device as a signature or on a removable media. The SSC 102 may utilize the decryption block 124 to decrypt the hard disk image using the disaster recovery key corresponding to the prior SSC secret key by setting the disaster mode bit to control the MUX 126 to operate in recovery mode. Subsequently, the data may be encrypted using the newly generated SSC secret key. At this point, the new password and the new SSC secret key will be active and ready to be utilized for a disaster recovery operation. Data recovery in cases where a password has been compromised is illustrated in FIG. 9.

Figure 9:
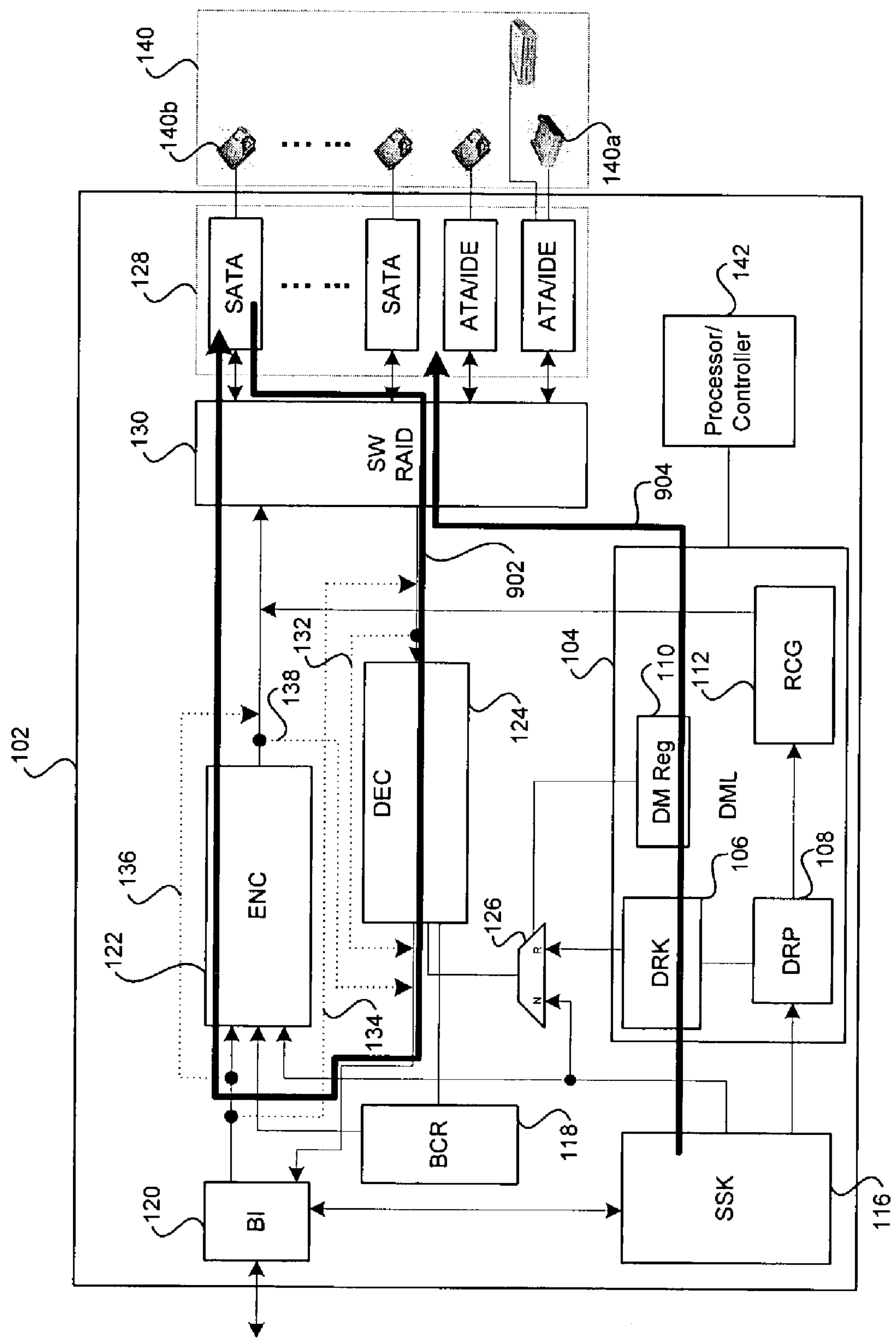
FIG. 9 is a block diagram illustrating an exemplary data recovery by the secured storage controller of FIG. 1 in accordance with an embodiment of the invention.

FIG. 9 is a block diagram illustrating an exemplary data recovery by the secured storage controller of FIG. 1 in accordance with an embodiment of the invention. Referring to FIG. 9, the secured storage controller 102 may be adapted to recover data when a password has been compromised. Path 902 illustrates an exemplary path that may be utilized by the secured storage controller 102 to retrieve data from the storage device, decrypt the data using an existing key, re-encrypting the decrypted data by the encryption block 122 and storing the encrypted data back onto the storage device. Path 904 illustrates an exemplary path that may be utilized to store a newly generated DRC onto the storage media. In this regard, the SSK block 116 and the DML block 104 may utilize the current password and DRC to generate the new disaster recovery key.

The system for securely managing the storage and retrieval of data may include at least one processor 142 adapted to control retrieval of a first disaster recovery code from a storage device and/or a storage media. The processor 142 may be adapted to control acquisition of a first password corresponding to the first disaster recovery code. The system may also include a disaster management block 104 configured to facilitate generation of a first disaster recovery key based on the first disaster recovery code and the first password. A recovery code generator 112 may generate the retrieved first disaster recovery code based on the first password and the first disaster recovery key. The processor 142 may also securely control storage of the generated disaster recovery code on the storage device and/or the storage media. A storage device interface block 128 may be provided to facilitate coupling of the storage device and/or the storage media to the system.

The system may also include an encryption block 122 that may be adapted to encrypt data stored on the storage device using the generated first disaster recovery key. A decryption block 124 may also be provided to utilize the generated first disaster recovery key to decrypt data read from the storage device. A selector or MUX 126 may be adapted to select between a normal operating mode and a recovery operating mode in which the recovery operating mode may require the generation of the first disaster recovery key. At least one bypass path, for example 132 and 138, may be configured to bypass the decryption block 124. At least one bypass control register 118 may be provided to control selection of one or more bypass paths, for example 132 and 138, required for bypassing the decryption block 124. One or more of the bypass paths, for example 134 and 136, may also be utilized to bypass the encryption block 122. The bypass control register 118 may also control selection of one or more of the bypass paths required for bypassing the encryption block 122.

The system may also include at least one bus interface block 120 coupled to the encryption block 122 and/or the decryption block 124. At least one register such as a secret key register 116, may be utilized for storing the disaster recovery key. The register 116 or other memory storing the disaster recovery key may be configured as a read-only register. In accordance with an aspect of the invention, the processor 142, the disaster management block 104, the selector 126, the bypass paths 132, 138, 132, 134, the bypass control register 118, the encryption block 122, the decryption block 124, the bus interface block 120, the storage device interface block 128 and the register 116 or memory for storing the disaster recovery key may be integrated in plug-in card, a chip or a processor core.

In light of the foregoing description, the secured storage controller 102 provides significant advantages over conventional storage methodologies and systems. The ability to integrate the secured storage controller 102 on a chip or on a plug-in card, may provide considerable flexibility in integrating and porting the secured storage controller 102 to any platform. Moreover, the secured storage controller 102 ensures the integrity of data irrespective of the status of the password, the secured storage controller and/or the storage device, and without the need for operating system support. Since the SSC secret key is never exposed, data integrity is ensured. Finally, data stored on a storage media may be easily accessed without having to authenticate each access.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for securely managing the storage and retrieval of data, the method comprising:

receiving a first disaster recovery code;

receiving a first password corresponding to said first disaster recovery code; and generating a first disaster recovery key based on said first disaster recovery code and said first password, wherein said received first disaster recovery code is generated based on said first password and said first disaster recovery key.

2. The method according to claim 1, comprising securely storing said generated disaster recovery code.

3. The method according to claim 1, comprising encrypting data stored on a storage device using said generated first disaster recovery key.

4. The method according to claim 1, comprising decrypting data read from a storage device using said generated first disaster recovery key.

5. The method according to claim 4, comprising selecting between a normal operating mode and a recovery operating mode, said recovery operating mode utilizing said generation of said first disaster recovery key.

6. The method according to claim 4, comprising bypassing said decrypting of said data read from said storage device.

7. The method according to claim 6, comprising selecting at least one bypass path for said bypassing of said decryption.

8. The method according to claim 3, comprising bypassing said encrypting of said data stored on said storage device.

9. The method according to claim 8, comprising selecting at least one bypass path for said bypassing of said encryption.

10. A machine-readable storage having stored thereon, a computer program having at least one code section for securely managing the storage and retrieval of data, the at least one code section being executable by a machine for causing the machine to perform steps comprising:

receiving a first disaster recovery code;

receiving a first password corresponding to said first disaster recovery code; and generating a first disaster recovery key based on said first disaster recovery code and said first password, wherein said received first disaster recovery code is generated based on said first password and said first disaster recovery key.

11. The machine-readable storage according to claim 10, comprising code for securely storing said generated disaster recovery code.

12. The machine-readable storage according to claim 10, comprising code for encrypting data stored on a storage device using said generated first disaster recovery key.

13. The machine-readable storage according to claim 10, comprising code for decrypting data read from a storage device using said generated first disaster recovery key.

14. The machine-readable storage according to claim 13, comprising code for selecting between a normal operating mode and a recovery operating mode, said recovery operating mode utilizing said generation of said first disaster recovery key.

15. The machine-readable storage according to claim 13, comprising code for bypassing said decrypting of said data read from said storage device.

16. The machine-readable storage according to claim 15, comprising code for selecting at least one bypass path for said bypassing of said decryption.

17. The machine-readable storage according to claim 12, comprising code for bypassing said encrypting of said data stored on said storage device.

18. The machine-readable storage according to claim 17, comprising code for selecting at least one bypass path for said bypassing of said encryption.

19. A system for securely managing the storage and retrieval of data, the system comprising:

at least one processor adapted to at least receive a first disaster recovery code;

said at least one processor adapted to at least receive a first password corresponding to said first disaster recovery code; and a disaster management block adapted to generate a first disaster recovery key based on said first disaster recovery code and said first password, wherein said at least one processor generates said received first disaster recovery code based on said first password and said first disaster recovery key.

20. The system according to claim 19, wherein said at least one processor is adapted to securely control storage of said generated disaster recovery code on at least one of a storage device and a storage media.

21. The system according to claim 20, comprising a storage device interface block adapted to facilitate coupling of said at least one of said storage device and said storage media.

22. The system according to claim 21, comprising an encryption block adapted encrypt data stored on said storage device using said generated first disaster recovery key.

23. The system according to claim 22, comprising a decryption block adapted to decrypt data read from said storage device using said generated first disaster recovery key.

24. The system according to claim 23, comprising a selector adapted to select between a normal operating mode and a recovery operating mode, said recovery operating mode utilizing said generation of said first disaster recovery key.

25. The system according to claim 24, comprising at least one bypass path adapted to bypass said decryption block.

26. The system according to claim 25, comprising at least one bypass control register adapted to control selection of said at least one bypass path for said decryption block.

27. The system according to claim 26, wherein said at least one bypass path is adapted to bypass said encryption block.

28. The system according to claim 27, wherein said at least one bypass control register is adapted to control selection of said at least one bypass path for said encryption block.

29. The system according to claim 28, comprising at least one bus interface block coupled to at least one of said encryption block and said decryption block.

30. The system according to claim 29, comprising at least one register for storing said disaster recovery key.

31. The system according to claim 30, wherein said at least one register for storing said disaster recovery key is a read-only register.

32. The system according to claim 30, wherein one or more of said at least one processor, said disaster management block, said selector, said at least one bypass path, said at least one bypass control register, said encryption block, said decryption block, said at least one bus interface block, said storage device interface block and said at least one register for storing said disaster recovery key are integrated in one or more of a plug-in card, a chip and a processor core.

* * * * *